(12) United States Patent
Bedford et al.

(10) Patent No.: US 7,467,148 B2
(45) Date of Patent: *Dec. 16, 2008

(54) REPORTING STATUS OF EXTERNAL REFERENCES IN A SPREADSHEET WITHOUT UPDATING

(75) Inventors: Jesse Raymond Bedford, Renton, WA (US); Matthew C. Gauthier, Redmond, WA (US); Tuan E. Huynh, Seattle, WA (US); Ramakrishnan NataraJan, Bellevue, WA (US); Justin M. Maguire, III, Seattle, WA (US); Marcella C. S. Rader, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 206 days.

This patent is subject to a terminal disclaimer.

(21) Appl. No.: 11/006,980

(22) Filed: Dec. 8, 2004

(65) Prior Publication Data

US 2005/0108623 A1 May 19, 2005

Related U.S. Application Data

(63) Continuation of application No. 09/755,414, filed on Jan. 5, 2001, now Pat. No. 6,898,760.

(51) Int. Cl.
*G06F 17/30* (2006.01)
*G06F 7/00* (2006.01)

(52) U.S. Cl. .................... 707/101; 707/102; 707/10

(58) Field of Classification Search ................. 707/101, 707/102, 10
See application file for complete search history.

(56) References Cited

U.S. PATENT DOCUMENTS

| 5,319,777 | A | * | 6/1994 | Perez | 707/10 |
| 5,778,385 | A |   | 7/1998 | Pratt | 707/200 |
| 5,966,716 | A | * | 10/1999 | Comer et al. | 707/203 |
| 6,049,799 | A |   | 4/2000 | Mangat et al. | 707/10 |

(Continued)

OTHER PUBLICATIONS

Microsoft Corporation, "Getting Started with Microsoft® FrontPage™ 97", 1996 Microsoft Corporation, Redmond, Washington, Document No. 92482-1096, OEM Document No. 000-40639, pp. 1-235.

(Continued)

*Primary Examiner*—Kuen S Lu
(74) *Attorney, Agent, or Firm*—Merchant & Gould

(57) ABSTRACT

The invention, in one embodiment, is a method and system for reporting the status of external references, or links, of a spreadsheet workbook. In an Edit Links dialog box, the user may view a list of links and their status. The user may select a Check Status button in the Edit Links dialog box to check the status of the links without updating the links because updating the links may require considerable time. A textual status message is displayed for each link in the Edit Links dialog box. The textual status message indicates to the user whether there is s possible problem with the link. As part of checking the status of a link, an analysis is made to determine whether any problems with the source file exist. For instance, it is determined whether the source file is open and whether it is valid. The results of this analysis determine what is displayed in the status column of the Edit Links dialog box.

17 Claims, 5 Drawing Sheets

U.S. PATENT DOCUMENTS

| | | | | |
|---|---|---|---|---|
| 6,157,934 | A | 12/2000 | Khan et al. | 715/503 |
| 6,567,822 | B1* | 5/2003 | Cudahy et al. | 707/104.1 |
| 6,631,497 | B1* | 10/2003 | Jamshidi et al. | 715/514 |
| 6,898,760 | B2 | 5/2005 | Bedford et al. | 715/503 |
| 6,973,656 | B1* | 12/2005 | Huynh et al. | 719/315 |
| 2004/0039743 | A1* | 2/2004 | Maleport et al. | 707/10 |

OTHER PUBLICATIONS

*Co-operative programming with Windows DDE*; Adrian Smith; *Proceedings of the International Conference on APL*, 1993, pp. 244-250.

*Light hypermedia link services: a study of third party application integration*; Hugh C. Davis, Simon Knight and Wendy Hall; *Proceedings of the 1994 ACM European conference on Hypermedia technology*, 1994, pp. 41-50.

Lamond, F.E. (1986) *Types of micro/mainframe link*. Pergamon Infotech, Maidenhead, Berks., UK.

Person et al., Using Microsoft Word and Excell in Office 97 Special Edition, "Chapter 40—Linking, Embedding, and Consolidating Worksheets" (Que Corporation, 1998).

Richter, Advanced Windows, Third Edition, Chapter 14—Copying, Deleting, Moving, and Renaming Files (Microsoft Press, 1997).

"Broked—A Link Checker" at www.pregnantpause.org/software/broked.htm (Pregnant Pause, 2000).

U.S. Appl. No. 11/007,008 filed Dec. 8, 2004, entitled "Reporting Status of External References in a Spreadsheet Without Updating", Inventors: Jesse Raymond Bedford et al.

U.S. Official Action mailed Jul. 29, 2008 in U.S. Appl. No. 11/007,008, Bedford et al., 6 pages.

* cited by examiner

REPORTING STATUS OF EXTERNAL REFERENCES IN A SPREADSHEET WITHOUT UPDATING

CROSS REFERENCE TO RELATED APPLICATIONS

This application is a continuation of copending U.S. patent application Ser. No. 09/755,414, entitled "Reporting Status of External References in a Spreadsheet Without Updating", filed Jan. 5, 2001, said application incorporated herein by reference.

TECHNICAL FIELD

The invention generally relates to electronic spreadsheet program modules, and more particularly relates to reporting the status of external references, or links, without updating the external references.

BACKGROUND

Electronic spreadsheet program modules are useful tools for helping users perform complex calculations. Many electronic spreadsheet program modules include the concept of a workbook with a number of worksheets in a workbook. An external reference, or link, from within one workbook may be made to another workbook. An external reference or link in an electronic spreadsheet may be generally described as when the value of one cell is dependent on the value of another cell in another spreadsheet. Cells may also depend on the value of a defined name or function in another worksheet. Graphic items, such as charts and text boxes, may also be linked to cells, defined names, or functions within another worksheet. Thus, generally described, a link refers to a workbook object (cell, named range, text box) whose content (value or formula) is dependent on an external source. The external source is typically another spreadsheet program but could also be a DDE server, OLE server, or anything that the spreadsheet program is capable of interpreting.

For example, links are commonly used when multiple spreadsheets with common structures are used, such as profit and loss statements for different groups within an organization (each group using their own spreadsheet). A summary spreadsheet may be created that links to values in the external spreadsheets and aggregates the data and formats the data for reporting to management. Of course, there are numerous other examples in which links can be used.

Although links are extremely useful, they can also be problematic. The client spreadsheet stores a local copy of the value of links and needs to be updated regularly to ensure that the data is up-to-date. If a link to the source workbook has not been updated, the source workbook has been moved, the source workbook has been renamed, etc., then the link may not function properly. For example, a common problem for electronic spreadsheet users is to have broken links (a link that cannot be updated) because files can no longer be found or worksheets have been renamed. For example, suppose a server is damaged and is replaced with a new server. The server would have a new name and, thus, any workbook linking to one of the files that was moved to the new server would have broken links because the workbook still believes the source files are located on the damaged server.

Because of the complex and critical calculations performed using spreadsheets, it is important for users to know whether or not the links in their workbook are valid. For example, corporations may maintain thousands of workbooks with a single workbook often having dozens or even hundreds of links. Maintaining these workbooks is often the sole job of employees. One solution to determine whether a link is valid is to attempt to update the link. Updating a link attempts to open the source workbook and any other supporting files. While updating, if the spreadsheet program module determines that a link is broken, the user is then prompted with a message for each broken link indicating that the link is broken. Although updating links works fairly well, it can quickly become burdensome if a workbook includes numerous links. For example, many corporations use workbooks to perform complex calculations and these workbooks may have links that take hours to update completely. Thus, the only way to check the status of links was to attempt to update the links and manually deal with errors on a sequential basis as the spreadsheet program module reports them. Checking status by updating links also changes the current values on the workbook. In many corporations, maintaining spreadsheets (e.g. making sure links work) is a job performed by IT or support personnel, whereas the analysis of the data is performed by other personnel. It is possible that updating links at the wrong time could interrupt the business process.

Thus, there is a need for reporting the status of links in electronic spreadsheets without updating the links so that users can quickly check the status of links.

SUMMARY OF THE INVENTION

The present invention meets the above-described needs by providing a method for quickly reporting the status of links within a workbook without updating the links. Updating links requires loading broad portions of the source file(s). The invention loads much smaller portions of the source file(s), thereby requiring much less time than would be required to actually update the links.

The invention, in one aspect, is a method and system for reporting the status of external references, or links, of a spreadsheet workbook. In an Edit Links dialog box, the user may view a list of links and their status. The user may select a Check Status button in the Edit Links dialog box to check the status of the links without updating the links because updating the links may require considerable time. A textual status message is displayed for each link source in the Edit Links dialog box. The textual status message indicates to the user whether there is a possible problem with any of the links that reference that link source. As part of checking the status of a link, an analysis is made to determine whether any problems with the source file exist. For instance, it is determined whether the source file is open and whether it is valid. The results of this analysis determine what is displayed in the status column of the Edit Links dialog box.

That the invention improves over the drawbacks of updating links and accomplishes the advantages described above will become apparent from the following detailed description of the exemplary embodiments and the appended drawings and claims.

DETAILED DESCRIPTION OF EMBODIMENTS OF THE INVENTION

An embodiment of the present invention will be incorporated into the "Microsoft EXCEL 2002" spreadsheet program module manufactured by Microsoft Corporation of Redmond, Wash. "Microsoft EXCEL 2002" may also be part of the "Microsoft OFFICE 2002" suite of application program modules. Briefly described, in one embodiment, the invention is a method for reporting the status of links in a workbook without updating the links. Different aspects of the source file are examined to determine whether the link is valid and acceptable. The invention examines the most common reasons that links break. The source file is examined to make sure that it exists and that it is in a proper format that can be opened. It is determined whether the reference (sheet, name) exists also. Rarely-encountered link problems which cannot be specifically identified will be reported as "Status Indeterminant".

Exemplary Operating Environment

Figure 1:
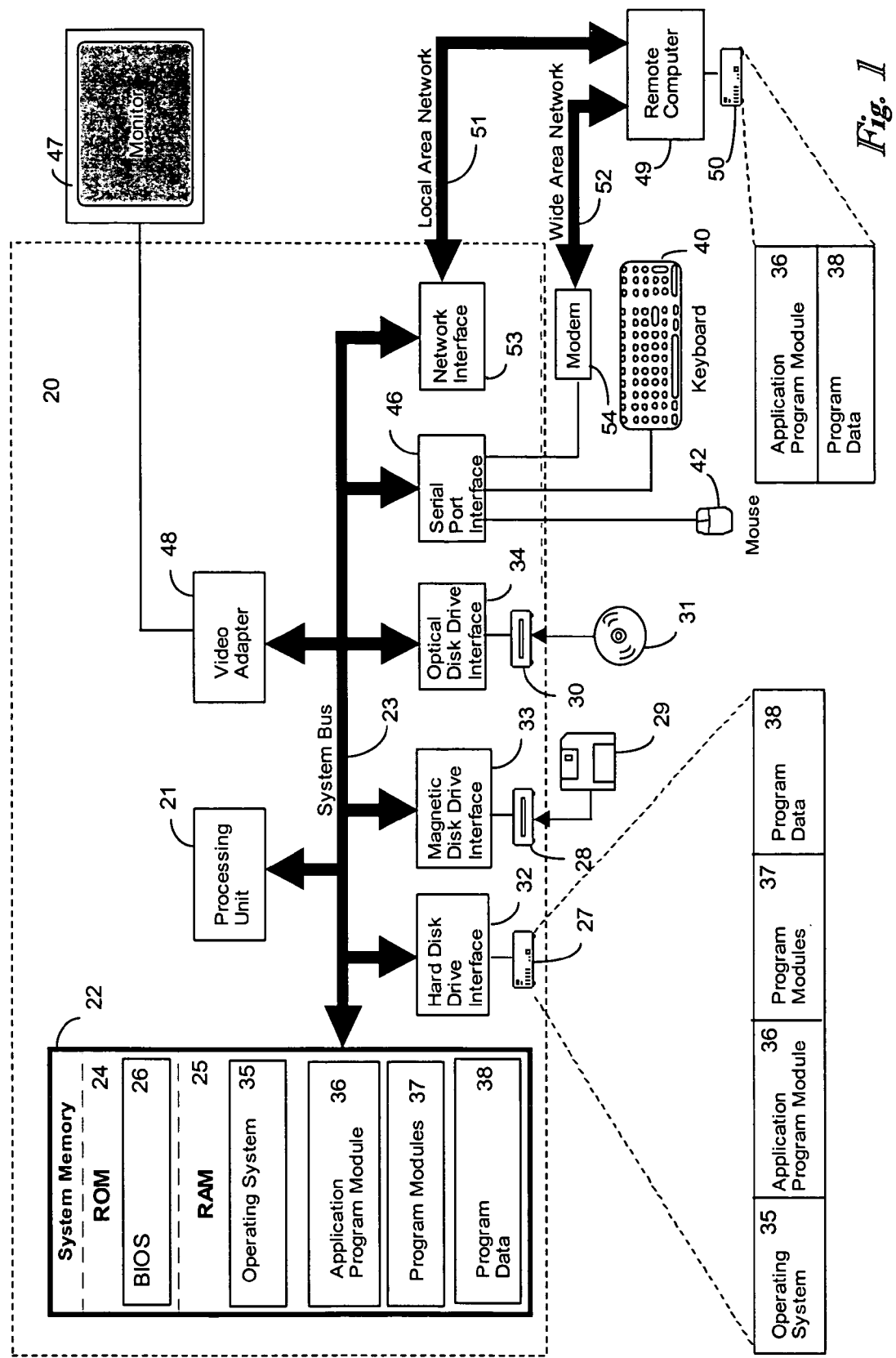
FIG. 1 is a block diagram of a personal computer that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, an application program module 36, such as Microsoft's "EXCEL 2002" spreadsheet program module, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Before proceeding with a detailed description of embodiments of the present invention, a brief description of links follows.

Links

Many electronic spreadsheet program modules include the concept of a workbook with a number of worksheets in a workbook. An external reference, or link, from within one workbook (the client workbook) may be made to another workbook (the source workbook). An external reference or link in an electronic spreadsheet may be generally described as when the value of one cell is dependent on the value of another cell in another spreadsheet. Cells may also depend on the value of a defined name or function in another worksheet. Graphic items, such as charts and text boxes, may also be linked to cells, defined names, or functions within another worksheet. The client workbook may also have a defined name which, in part or in its entirety, is linked to a name, cell, function, etc. in another workbook.

Although links are extremely useful, they are also problematic. If a link to the source workbook has not been updated, the source workbook has been moved, etc., then the link may not function properly. Links are not live connections to the source, so the values of links must be refreshed. A link may be updated when the workbook is opened (either automatically or by prompting the user to update the link). After the workbook is opened, the user can update links manually on an individual basis using the Edit Links dialog. Links are also updated when first created (or edited). Links may also be updated using VBA (a macro). A common problem for electronic spreadsheet users is to have broken links because files can no longer be found or workbooks have been renamed. For example, suppose a server is damaged and is replaced with a new server. The server would have a new name and, thus, any workbook linking to one of the files that was moved to the new server would have broken links because the worksheet believes the source files are located on the damaged server.

Throughout this description, the terms source file and supporting file will be used interchangeably. The terms dependent file and client file will also be used interchangeably.

Figure 2:
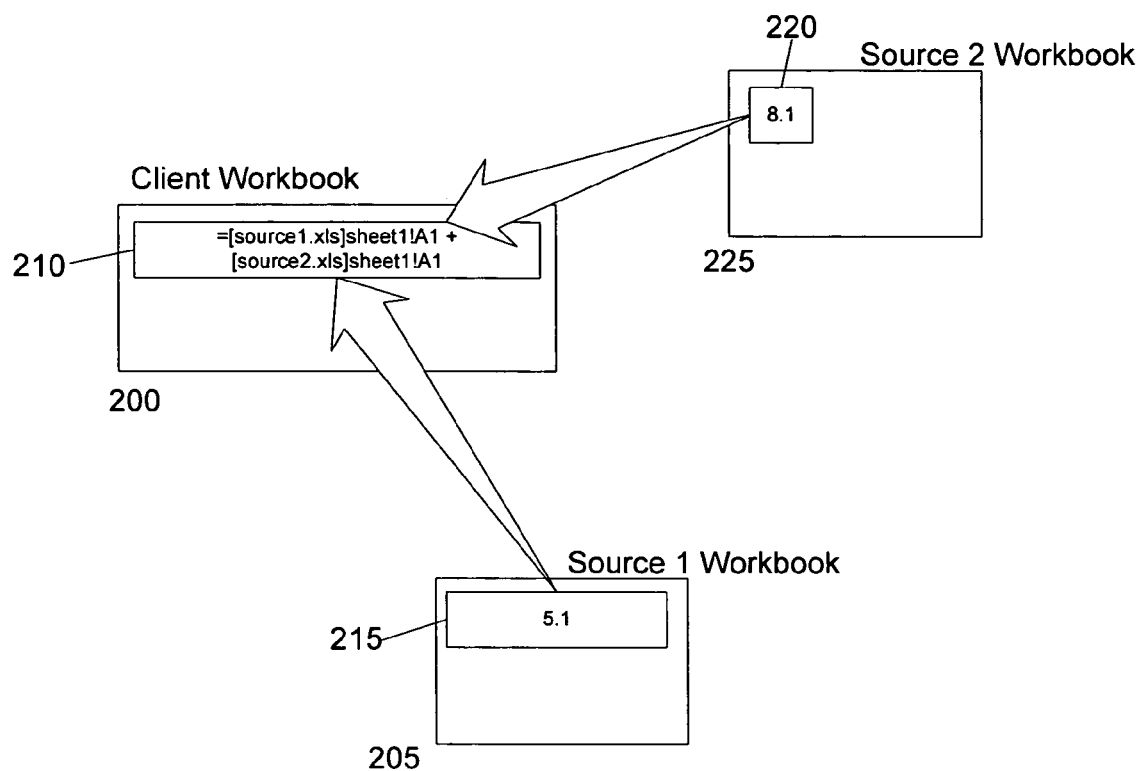
FIG. 2 is an illustration of a client workbook with links to source workbooks.

The most common type of link is a cell being linked to another cell (as described in FIG. 2). However, the invention is not limited to only cell to cell links. Referring now to FIG. 2, an illustration of a client workbook 200 with links to source workbooks 205 and 225 will be described. In this illustration, it is assumed that client.xls, source1.xls, and source2.xls are stored in the same directory. The client workbook includes a cell 210. The formula of cell 210 is =[source1.xls]sheet1!A1+ [source2.xls]sheet1!A1. In other words, the value of cell 210 is dependent upon cell A1 (215) of sheet1 of the workbook source1.xls and cell A1 (220) of sheet1 of the workbook source2.xls. Thus, the value of cell 210 is "linked" to cell A1 of sheet1 of the workbook source1.xls and cell A1 of sheet1 of the workbook source2.xls. Thus, updating the link in cell 210 may take considerable time due to the multiple workbooks that may need to be opened and recalculated. Of course, the description above is a simple one with only a couple of links. It is not uncommon to have hundreds of links to hundreds of different workbooks. In these cases, updating time is considerably longer than the simple example described above.

As will be described, in one embodiment, the present invention provides a method for checking the status of all links in a workbook without updating the links. The invention may report the status of the link so that the user is aware of a problem or a potential problem with the link. In one embodiment, the invention is an Edit Links dialog box listing all of the links in a workbook. Along with each link is listed a status condition under a status column. The Edit Links dialog box also comprises a Check Status button that, when selected, begins the process of checking the status of each link without updating each link. It is again worth noting that links are not live connections and, thus, the status of the source may change at any time. Hence, the status of each link may need to be checked at a given time.

Edit Links Dialog Box

Figure 3:
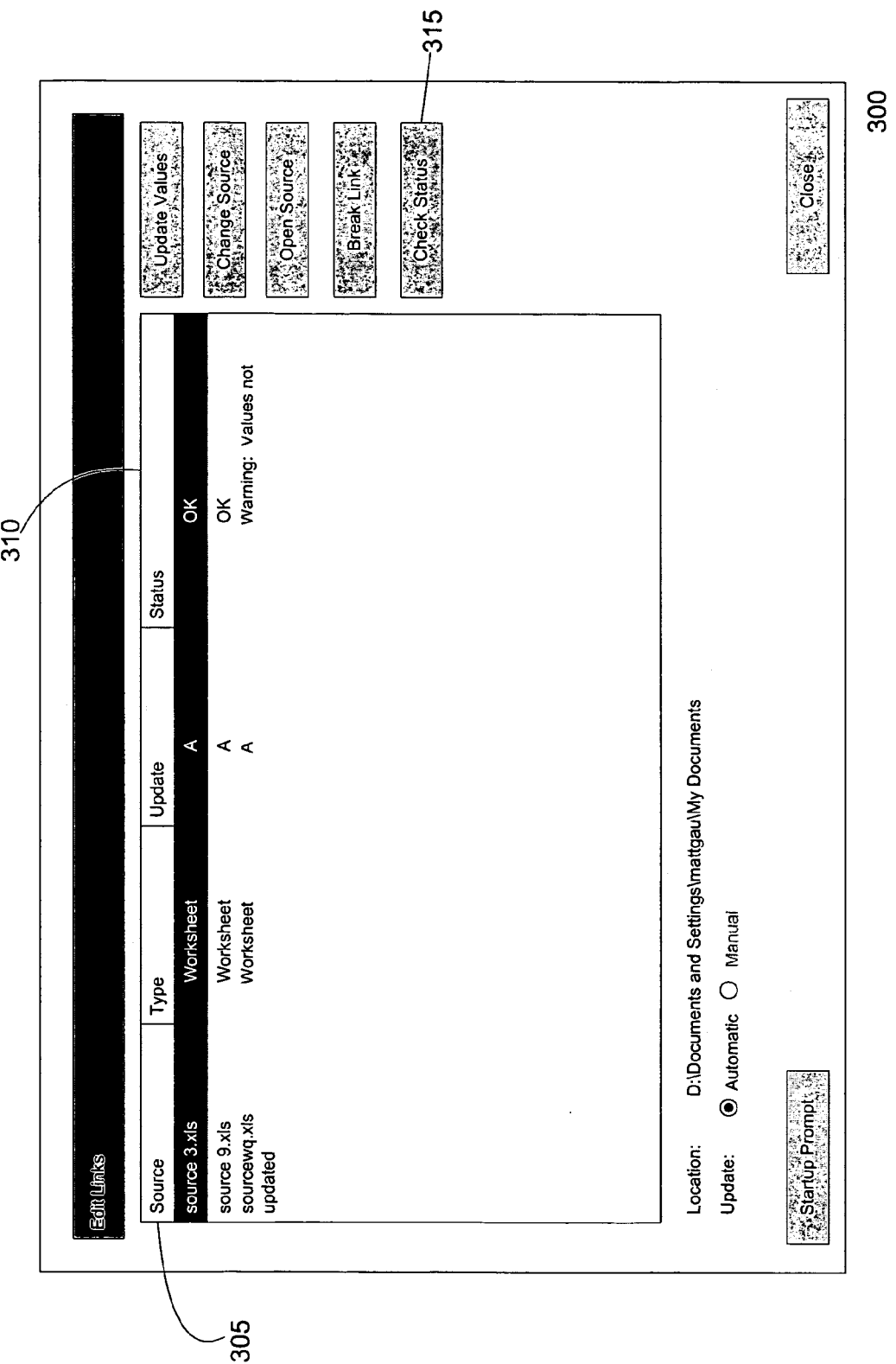
FIG. 3 is an Edit Links dialog box in accordance with an embodiment of the present invention will be described.

In one embodiment, the invention includes an Edit Links dialog box. Referring now to FIG. 3, an Edit Links dialog box 300 in accordance with an embodiment of the present invention will be described. The Edit Links dialog box 300 may be displayed when the user selects the "links" feature under the "edit" menu.

The Edit Links dialog box 300 includes a list of all the links in the active spreadsheet workbook. The source workbook for each link is listed under a source column 305. The Edit Links dialog box also includes a status column 310. The status column is used to indicate the status of each link. The Edit Links dialog box also includes a Check Status button 315. When selected, the Check Status button 315 initiates the method for checking (or refreshing) the status of the links in the active workbook. The status of each link is checked without actually having to update the link. A method for checking the status of a link without updating in accordance with an embodiment of the present invention will be described in reference to FIG. 4.

When the Edit Links dialog box 300 is opened, the default status for each link is noted as "Unknown" before the user selects the Check Status button 315. Each link is referred to as "Unknown" because even if the status of a link was checked earlier in a session, external factors may have changed the status of the link since the last time it was checked. For example, the server on which the source file is found may have gone down, the source file may have been deleted or moved, etc. Therefore, the status for each link is reset to "Unknown" whenever the Edit Links dialog box 300 is brought up and the user must manually check links to determine the current status of links.

It should be understood from the foregoing description that typically the program module for checking the status of links in an electronic spreadsheet is called and executed in response to a user selecting the Check Status button 315. Of course, other embodiments of the present invention may call and execute the program module for checking that status of links in a background thread. For example, the status of links may be automatically checked each time the Edit Links dialog is brought up and displayed.

It should also be understood that, in a preferred embodiment, the program module for checking the status of links will be part of the "Microsoft EXCEL 2002" spreadsheet program module manufactured by Microsoft Corporation.

Determining Status of Links Without Updating the Links

Figure 4A:
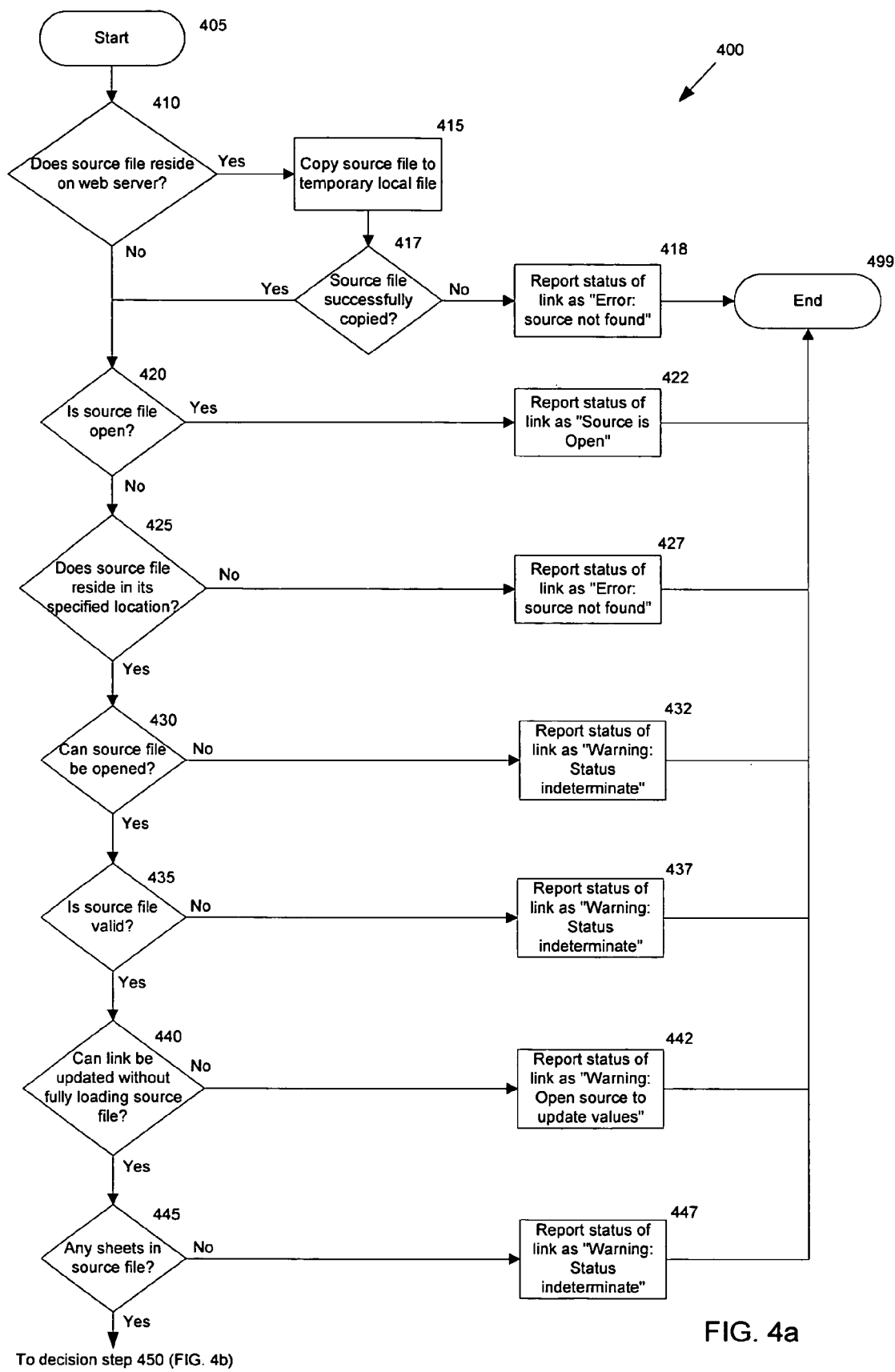
FIGS. 4a-4b are a flow diagram illustrating a method for determining the status of links in an electronic spreadsheet in accordance with an embodiment of the present invention.
Figure 4B:
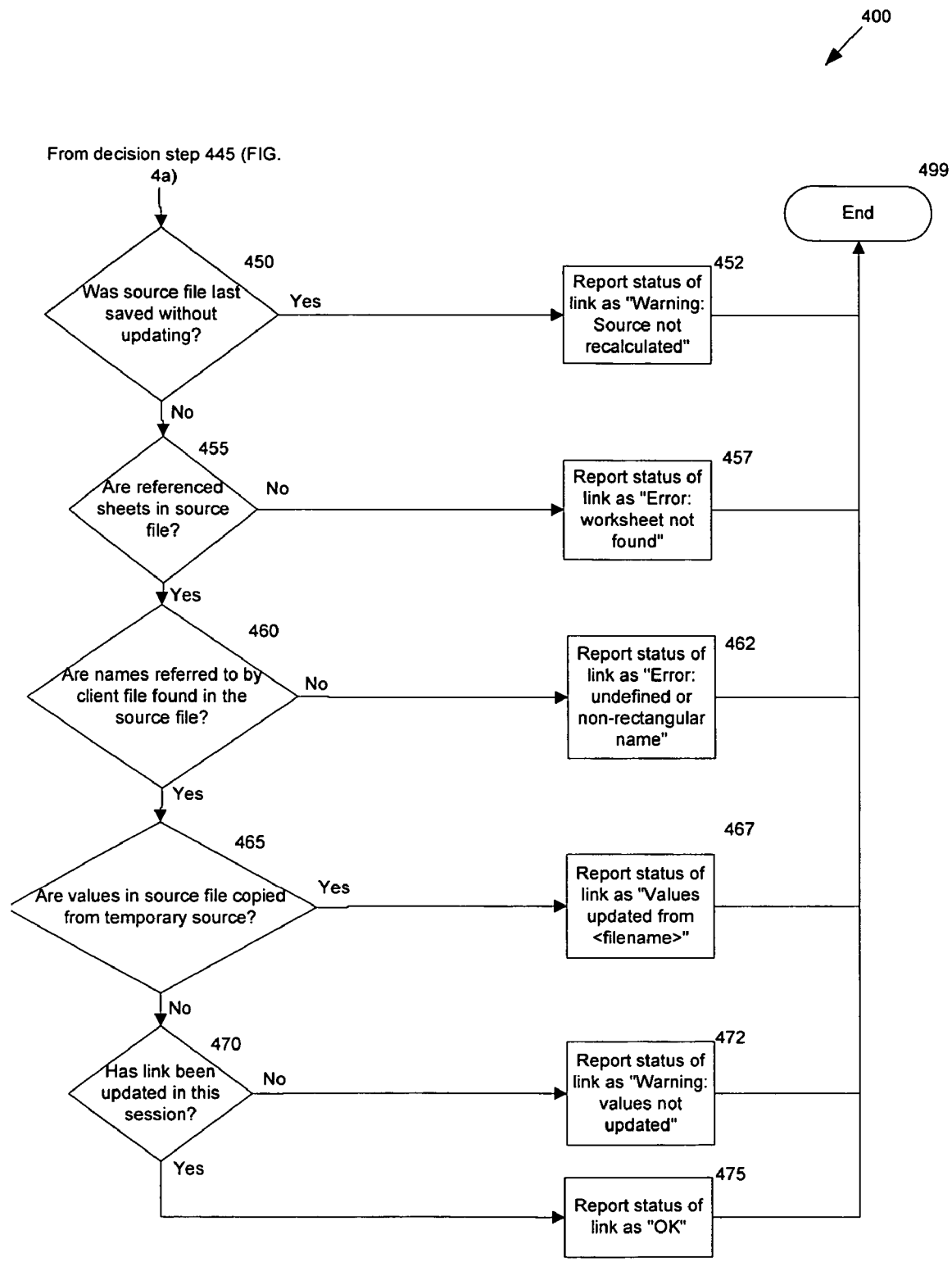

Referring now to FIGS. 4a-4b, a flow diagram 400 will be described. The flow diagram 400 illustrates a method for determining the status of links in an electronic spreadsheet in accordance with an embodiment of the present invention. Those skilled in the art will appreciate that the logic flow diagram of FIGS. 4a-4b is executed by the processing unit 21 (FIG. 1) in response to instructions that have been incorporated into the application program module 36.

The method 400 begins at start step 405 and typically proceeds to decision step 410 when the user selects the Check Status button 315 (FIG. 3). Of course, besides a button, other indications may be given by the user to indicate that the user wants to check the status of links in an electronic spreadsheet. Also, the method 400 may proceed in the background and may automatically proceed to decision step 410 based on the user opening the Edit Links dialog (FIG. 3).

At decision step 410, it is determined whether the source file that is linked by the client workbook resides on a web server. If not, then the method proceeds to decision step 420. However, if the source file resides on a web server, then the method proceeds to step 415 and, for performance reasons, the source file is copied to a temporary local file on the user's computer and the method proceeds to decision step 417.

At decision step 417, it is determined whether the source file was successfully copied at step 415. If the source file is not able to be copied to the temporary local file, then the method proceeds to step 418 and the status of the link is reported as "Error: source not found". The method ends at step 499. However, if the source file is successfully copied, then the method then proceeds to decision step 420.

At decision step 420, it is determined whether the source file is open. It is important to determine whether the source file is open because checking the link to a file stored on disk as contemplated by the present invention is different than checking the link to a workbook which is resident in memory. Links to resident workbooks may not be out-of-date and, if there is a problem with a link to a resident workbook it will manifest itself as an error within the cell. For example, in a resident workbook, an error indicator of "#NAME?" or another error indicator may be displayed in a cell if a link to a name or a worksheet has been renamed or no longer exists. Thus, if it is determined that the source file is open, then the method proceeds to step 422.

At step 422, the status of the link is reported as "Source is open" and the method ends at step 499.

If, at decision step 420, it is determined that the source file is not open, the method proceeds to decision step 425.

At decision step 425, it is determined whether the source file resides in its specified location (this has already been determined for source files that reside on a web server). Typically, determining whether the source file resides in its specified location is performed via a call to the operating system asking if the source file resides in the specified location. If it is determined that the source file resides in its specified location, then the method proceeds to decision step 430. However, if it is determined that the source file doesn't reside in the specified location, then the method proceeds to step 427 and the status of the link is reported as "Error: Source not found". The method ends at step 499.

At decision step 430, it is determined whether the source file can be opened. If the source file cannot be opened, then the method proceeds to step 432 and the status of the link is reported as "Warning: Status indeterminate" and the method ends at step 499. If, at decision step 430, it is determined that the source file can be opened, the method proceeds to decision step 435. It should also be understood that, in one embodiment of the present invention, a determination is made at decision step 430 to determine if the source file is a "Microsoft EXCEL" version 1.5 spreadsheet program module file and, if it is, then the method proceeds to step 432. The "Microsoft EXCEL" version 1.5 spreadsheet program module was a Macintosh only version. Most current versions of the "Microsoft EXCEL" spreadsheet program module cannot open this file format.

At decision step 435, the validity of the source file is checked by determining whether it is in the correct format, is not locked, is not corrupt, etc. There are many things that can make the source file invalid. If a file is in a particular format, then there are specific details that should be in pre-specified locations in the file. If these specific details are not found in the pre-specified locations, then the source file cannot be read. For example, if the source file is in .xls format then the number of sheets and their names are located at a particular location from the beginning of the source file. However, if the file has been corrupted, then it may not have this information in its correct location and may be determined to be an invalid file. If the source file is locked, in an incorrect format, corrupt, etc. then the method proceeds to step 437. At step 437, the status of the link is reported as "Warning: Status indeterminate" and the method ends at step 499. If the source file is determined to be valid at decision step 435, then the method proceeds to decision step 440.

At decision step 440, it is determined whether the link cannot be updated unless the source file is fully loaded into the spreadsheet program module (in other words, whether the file must be fully loaded into RAM becoming a resident workbook). For instance, even though a source file may be opened, the link may not be able to be updated unless the source file is fully loaded into the spreadsheet program module. It should be understood that for certain files, the values in the source file cannot be updated unless the source file is opened. This occurs with HTML files, text files and certain other file formats. The "Microsoft EXCEL" spreadsheet program module can open many different file formats, such as "LOTUS 123" files, plain text files, etc. However, the "Microsoft EXCEL" program module doesn't support updating links to these files remotely, i.e., without the source file being open. Once a file is opened in the "Microsoft EXCEL" spreadsheet program module (loaded into memory), regardless of its original file type it becomes a workbook structure in RAM. Although the file is not automatically converted, once the file is loaded it is treated like any other "Microsoft EXCEL" workbook (hence links can be updated). The "Microsoft EXCEL" spreadsheet program module knows which file types it can not update links from remotely (e.g. TXT) so when these types of files are encountered the status display tells users to open the source file. If the link cannot be updated unless the file is fully loaded into the spreadsheet program module, then the method proceeds to step 442. At step 442, the status of the link is reported as "Warning: Open source to update values" and the method ends at step 499.

If at decision step 440, it is determined that the link may be updated without fully loading the source file, then the method proceeds to decision step 445.

At decision step 445, it is determined whether there are any worksheets in the source file that may be loaded. If there are no worksheets in the source file, then the method proceeds to step 447. At step 447, the status of the link is reported as "Warning: Status indeterminate" and the method ends at step 499. However, if at decision step 445, it is determined that there are worksheets in the source file, then the method proceeds to decision step 450 (FIG. 4*b*).

At decision step 450, it is determined whether the source file was last saved without being fully calculated (so that the values may be out dated). This decision step is used because even if the link is valid and has been updated, the source file may have been last saved without being fully calculated so the values in the source file may be outdated. Typically, there is a bit in the source file that indicates whether the status is calculated or uncalculated. If so, then the source file is out-of-date and the method proceeds to step 452. At step 452, the status of the link is reported as "Warning: Source not recalculated" and the method ends at step 499. If, at decision step 450, it is determined that the source file was last saved with updating, the method proceeds to decision step 455.

At decision step 455, it is determined whether the worksheets referred to by the link in the client file are available in the source file. If not, then the method proceeds to step 457. At step 457, the status of the link is reported as "Error: Worksheet not found" and the method ends at step 499. However, if the worksheets referred to by the client file are available in the source file, then the method proceeds to decision step 460.

At decision step 460, it is determined whether the defined names that are referred to by the link in the client file can be found in the source file. It should be understood that names may be defined in the "Microsoft EXCEL" spreadsheet program module to easily refer to a value or number found in another workbook. For example, the annual percentage rate may be referred to as APR and may be found in a single workbook. However, the annual percentage rate may be named "APR" and referred to in numerous other workbooks. Thus, every time a user wants to refer to the annual percentage rate in a calculation, the user simply uses the name "APR" to link to the annual percentage rate.

If at decision step 460, it is determined that the names referred to by the client file are not found in the source file, then the method proceeds to step 462. At step 462, the status of the link is reported as "Error: Undefined or non-rectangular name" and the method ends at step 499. Without fully loading the source workbook into RAM, only rectangular cell references can be updated. This could be as small as one cell (1×1) but non-rectangular links can't be updated without loading the workbook into RAM. So, if a defined name (such as APR) refers to Sheet1!A1, that can be updated without loading into RAM. However, if the defined name does not refer to a cell (for example, it could reference a direct numeric value or a user-defined function), then the source workbook must be loaded into RAM before the link can be updated. However, if at decision step 460, it is determined that the names referred to by the client file are found in the source file, then the method proceeds to decision step 465.

At decision step 465, it is determined whether the values in the source file have been copied from a temporary source. For example, suppose a client file exists with references to a source file that cannot be found. The user may choose to temporarily use values from a different workbook (the temporary source). If the values in the source file have been copied from a temporary source, then the method proceeds to step 467. At step 467, the status of the link is reported as "Values updated from <filename>" (where filename indicates the temporary source) and the method ends at step 499. If at decision step 465, it is determined that the values in the source file have not been copied from a temporary source, the method proceeds to decision step 470.

At decision step 470, it is determined whether the link has been updated in this session. The session may be defined as the time between the opening of the workbook and the closing of the workbook. Updating the link refers to copying the values from the source file (without modifying the source file). If it is determined that the link has not been updated this session, the method proceeds to step 472, the status of the link is reported as "Warning: Values not updated" and then the method ends at step 499. However, if the link has been updated in this session, then the method proceeds from decision step 470 to step 475.

At step 475, the link has been determined to be valid and up-to-date and the status of the link is reported as "OK" and the method ends at step 499.

Of course, it should be understood that the method 400 described above is a method for checking the status of a single link. If there are other links in the client file that need to be checked, then, rather than ending at step 499, the method returns to step 410 and the process is repeated for every other source file linked to from the client file.

It should be understood that an important aspect of the present invention is that it enables the user to manage links easily. By presenting the status of all links in a workbook in a single dialog, the present invention helps a user know which links have been updated, which links have not been updated and for what reason they have not been updated. The present invention does not cause the user to wait during an updating of the links and navigate through a series of dialogs. Instead, the present invention allows the user to determine the status of a link and, if necessary, easily fix the link.

Having described several embodiments of the invention above, it should be understood that the present invention provides a method for updating links in an electronic spreadsheet without updating the links. For example, suppose an electronic spreadsheet workbook has links to thousands of source files and suppose it requires over an hour to update these links. If a user wants to ensure all the links are valid but does not want to spend an entire hour to do so, the user may open the workbook and choose "Don't update" when prompted to update external references. Then, the user can choose Links from the Edit menu and an Edit Links dialog will be displayed. The Edit Links dialog includes a list of all the links in the workbook and their current status. If the user selects the "Check status" each linked file will be quickly checked to verify that it exists and is of a valid structure so that the link can be updated at a later time. The Edit Links dialog then displays the status of each link.

It should be understood that the present invention enables the deployment of an automated program that can open many workbooks in sequence to check statuses of links and create a log. For example, using an automated program, a corporation could run this program on their large file shares with hundreds or thousands of workbooks and have large log files written out.

It should be understood that the foregoing pertains only to the preferred embodiments of the present invention, and that numerous changes may be made to the embodiments described herein without departing from the spirit and scope of the invention.

We claim:

1. A computer-readable storage medium including computer executable instructions for performing a method for reporting a status of a link in a spreadsheet application, the link associated with a source file, the method comprising:
   receiving the selection of a link to check using the spreadsheet application;
   examining the source file within the spreadsheet application without updating the link by determining whether or not the source file is valid,
   wherein the source file is determined to be valid if source file details are present in pre-specified locations in the source file,
   the details comprising a number of spreadsheets and
   the name of the spreadsheets in the source file and
   the pre-specified locations comprising a particular location from the beginning of the source file, and
   wherein the source file is determined to be invalid if the details about the source file are not present in the pre-specified locations,
   wherein an invalid source file cannot be read and comprises at least one of:
   an incorrect format, a locked file, and a corrupt file; and
   reporting the status of the link based on the examination of the source file.

2. The computer-readable storage medium of claim 1, the method further comprising receiving an indication to check the status of the link.

3. The computer-readable storage medium of claim 1, the method further comprising displaying the status of the link.

4. The computer-readable storage medium of claim 1, the method further comprising determining whether the source file resides at a specified location.

5. The computer-readable storage medium of claim 1, the method further comprising determining whether the source file is open or can be opened.

6. The computer-readable storage medium of claim 1, the method further comprising selecting the link from a plurality of links.

7. The computer-readable storage medium of claim 1, the method further comprising determining whether the link may be updated without fully loading the source.

8. The computer-readable storage medium of claim 1, the method further comprising determining whether a worksheet referenced by the link is associated with the source.

9. The computer-readable storage medium of claim 1, the method further comprising displaying updated links, links not updated, and a reason associated with any links not updated.

10. A method in a spreadsheet application, the method comprising:

selecting a link to check within a spreadsheet using the spreadsheet application;

checking a status of the link by examining an associated source file without updating the link, wherein the examination of the source file at least determines whether problems exist with the source file by determining whether or not the source file is valid, wherein the source file is determined to be valid if source file details are present in pre-specified locations in the source file, the details comprising a number of spreadsheets and the name of the spreadsheets in the source file and the pre-specified locations comprising a particular location from the beginning of the source file, and wherein the source file is determined to be invalid if the details about the source file are not present in the pre-specified locations, wherein an invalid source file cannot be read and comprises at least one of:

an incorrect format, a locked file, and a corrupt file; and reporting the status of the link.

11. The method of claim 10 further comprising determining whether the source file exists.

12. The method of claim 10 further comprising automatically checking the status of the link.

13. The method of claim 10 further comprising determining whether the source file resides at a specified location.

14. A system having computer-executable code causing the system to perform a method in a spreadsheet application, the system comprising:

means for selecting a link to check within a spreadsheet using the spreadsheet application;

means for checking the link, the link associated with a source file and the spreadsheet application;

means for determining whether problems exist with the source file by determining whether or not the source file is valid, wherein the source file is determined to be valid if source file details are present in pre-specified locations in the source file, the details comprising a number of spreadsheets and the name of the spreadsheets in the source file and the pre-specified locations comprising a particular location from the beginning of the source file, and wherein the source file is determined to be invalid if the details about the source file are not present in the pre-specified locations, wherein an invalid source file cannot be read and comprises at least one of:

an incorrect format, a locked file, and a corrupt file;

means for determining a condition of the link by presenting the source file without updating the link; and means for displaying the status of the link.

15. The system of claim 14 further comprising means for determining whether the source file exists.

16. The system of claim 14 wherein the means for checking a link is further operable to automatically check the status of the link.

17. The system of claim 14 further comprising means for determining whether the source file resides at a specified location.

* * * * *